United States Patent [19]

Porter

[11] Patent Number: 4,842,251
[45] Date of Patent: Jun. 27, 1989

[54] PULLEY WITH CORD RETENTION MEMBER

[76] Inventor: Glenn A. Porter, c/o BTM Industries, Inc., 604 Washington, Woodstock, Ill. 60098

[21] Appl. No.: 90,572

[22] Filed: Aug. 28, 1987

[51] Int. Cl.[4] .............................................. B66D 3/04
[52] U.S. Cl. ................................ 254/390; 242/157 R; 254/335; 254/411
[58] Field of Search ............... 254/326, 333, 334, 335, 254/336, 337, 338, 371, 380, 383, 390, 403, 411; 242/157 R; 226/183, 196, 168

[56] References Cited

U.S. PATENT DOCUMENTS

| | | | |
|---|---|---|---|
| 90,810 | 6/1869 | Bernier | 254/334 |
| 733,605 | 7/1903 | Taylor | 254/403 X |
| 818,335 | 4/1906 | Ballew et al. | 254/390 X |
| 926,878 | 7/1909 | Kelley | 254/411 |
| 1,489,902 | 4/1924 | Segelhorst | 254/383 X |
| 2,210,202 | 8/1940 | Duda | 254/403 |
| 2,360,713 | 10/1944 | Parker | 254/337 |

FOREIGN PATENT DOCUMENTS

| | | | |
|---|---|---|---|
| 56909 | 8/1982 | European Pat. Off. | 254/383 |
| 314927 | 10/1919 | Fed. Rep. of Germany | 254/390 |

Primary Examiner—Joseph J. Hail, III
Attorney, Agent, or Firm—Wood, Dalton, Phillips, Mason & Rowe

[57] ABSTRACT

A pulley assembly is provided for an operating cord. The pulley has a body with a rotational axis and an annular outer surface concentric with the rotational axis. A cord retention member has a surface to be situated around the annular outer pulley surface in operative relationship with the pulley and extending more than 180° around the annular outer pulley surface. Structure is provided on the pulley and cord retention member to cooperate with the cord so that the cord prevents separation of the pulley and cord retention member from their operative relationship.

15 Claims, 2 Drawing Sheets

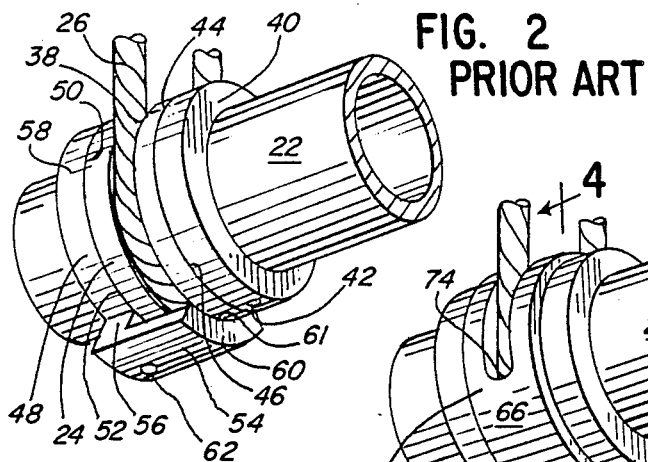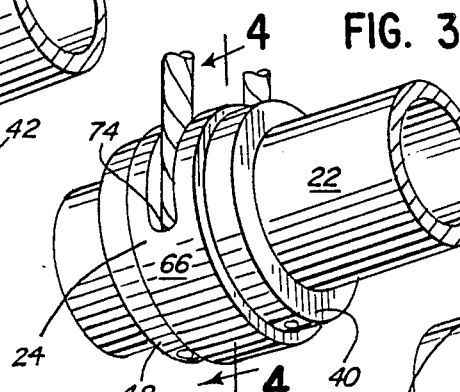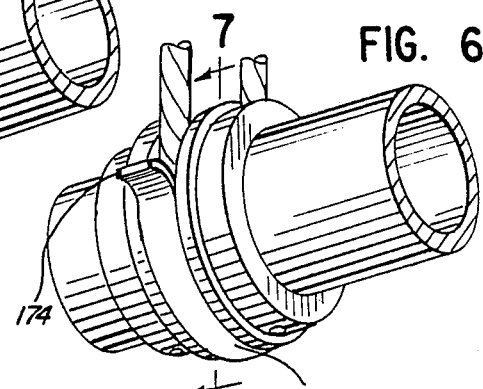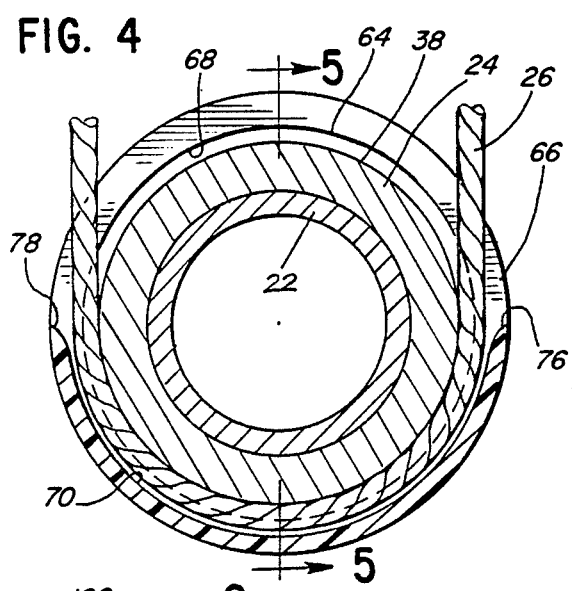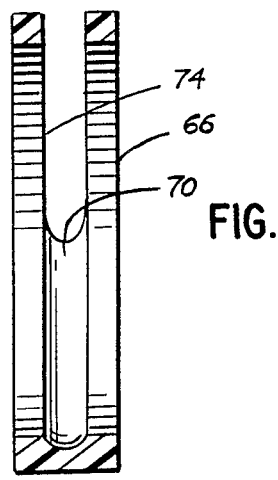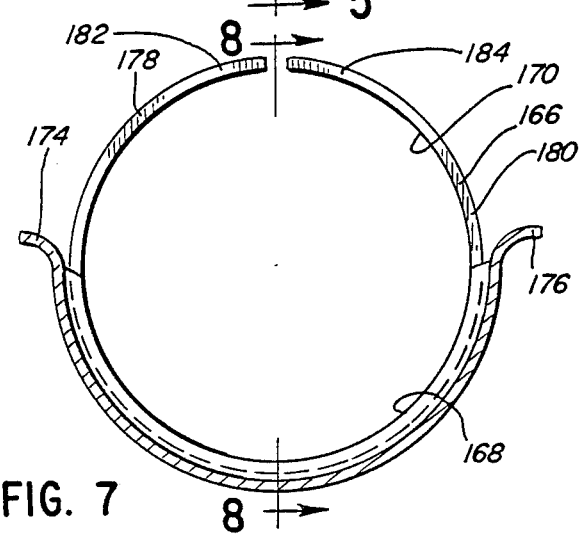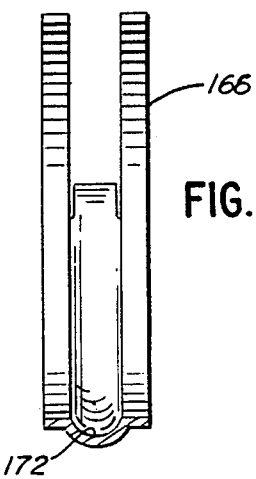

PULLEY WITH CORD RETENTION MEMBER

BACKGROUND OF THE INVENTION

1. Field of the Invention

This invention relates to rotatable pulleys for guiding travel of a cord and, more particularly, to structure for keeping a cord trained around the pulley.

2. Background Art

Rotatable pulleys for guiding travel of a cord or rope are used in many different environments. As long as there is tension on the cord it will naturally seek centered relationship on the pulley, as in a groove.

However, when the cord is slackened, there is a tendency of the cord to fall out of the groove and off of the pulley. One known solution to this problem has been to fix a shield on a shaft carrying the pulley so that the shield overlies the cord situated in the pulley groove. Normally, the shield extends only a short distance around the pulley perimeter.

This construction has the serious drawback that with the cord slackened there is a tendency of the cord to entangle with the shield. This is particularly a problem in environments where the pulley is submerged, as in water, and the cord tends to float in an uncontrolled manner.

This construction has a further drawback that the shield must be fixed, as to the shaft supporting the pulley, so that the shield remains stationary relative to the rotating pulley.

SUMMARY OF THE INVENTION

The present invention is specifically directed to overcoming the above enumerated problems in a novel and simple manner. According to the invention, a pulley assembly is provided for an operating cord or rope. The pulley has a body with a rotational axis and an annular outer surface concentric with the rotational axis. A cord or rope retention member has a surface for situation around the annular outer pulley surface, with the retention member in operative relationship with the pulley, and extending more than 180° around the annular outer pulley surface. Structure is provided on the pulley and cord retention member to cooperate with the cord so that the cord prevents separation of the pulley and cord retention member from their operative relationship.

According to the invention, a separate pulley and cord or rope retention member can be manufactured and held in operative relationship solely by a cord passed around the pulley. This obviates the need for attaching the cord retention member on the stationary structure on which the pulley rotates. The user has the option of using the retention member or leaving it off.

The retention member can be made from metal, plastic or any other suitable material. In one form of the invention, the retention member is formed from a rectangular blank of sheet metal material. The metal is formed in the shape of a generally circular body. A recess is pressed radially outwardly of the retention member surface that surrounds the pulley and at least one tab is struck from the body and bent radially outwardly to thereby define an opening to permit passage of the cord therethrough. The retention member so constructed is maintained on the pulley by the cord in the same manner as previously described. The adjacent free ends of the blank can be slightly spaced or welded together. In the former case, the metal is of sufficiently heavy gauge to hold its shape.

BRIEF DESCRIPTION OF THE DRAWINGS

FIG. 2 is a perspective view of a prior art pulley assembly having a conventional fixed shield to keep the cord on the pulley;

FIG. 3 is a perspective view of a pulley assembly having the present invention incorporated;

FIG. 4 is a sectional view of the pulley assembly taken along line 4—4 of FIG. 3;

FIG. 5 is a sectional view of the pulley assembly taken along line 5—5 of FIG. 4;

FIG. 6 is a perspective view of a pulley assembly with an alternative form of the invention incorporated;

FIG. 7 is a sectional view of the pulley assembly taken along line 7—7 of FIG. 6; and FIG. 8 is a sectional view of the pulley assembly taken along line 8—8 of FIG. 7.

DETAILED DESCRIPTION OF THE DRAWINGS

Figure 1:
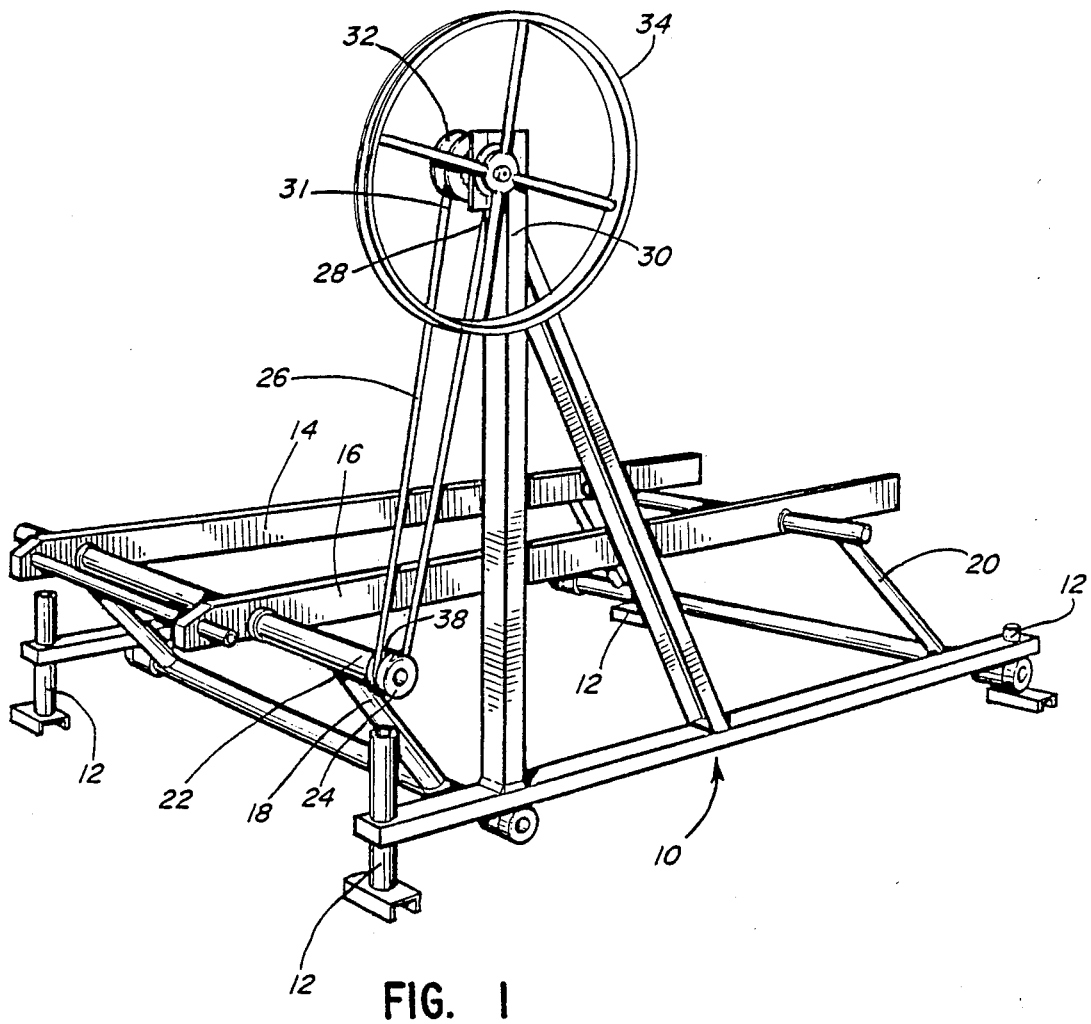
FIG. 1 is a perspective view of a lift for a marine craft having a pulley that in operation is submerged and to which the present invention is adaptable.

In FIG. 1, a lift for a marine craft is shown and is discussed herein to demonstrate one particular environment wherein the present invention has particular utility. The lift in FIG. 1 is the subject of my co-pending application Ser. No. 019,437 entitled "Lift for Marine Craft" now U.S. Pat. No. 4,787,327.

Briefly, the lift has a rectangular base at 10 with four associated legs 12 for bearing on the bottom surface of a like above which a craft is to be hoisted. Two elongate rails 14, 16, extending lengthwise of the lift, cooperatively define a cradle for the craft. The rails 14, 16 are moved vertically in unison by counterclockwise pivoting in FIG. 1 of a forward arm assembly 18 and a rearward arm assembly 20. Each assembly 18, 20 is pivotally connected to the base 10 and the rails 14, 16. The forward arm assembly 18 has a lateral extension arm 22 on which a pulley 24 is journalled for rotation. Raising and lowering of the rails 14, 16 is accomplished by selectively reeling in and paying out a cord or rope 26. The cord has one end 28 anchored to an upright 30, is trained around the pulley 24 and has its other end 31 operatively attached to a winch 32. Retrieval of the cord 26 on the winch 32 by manipulation of a wheel 34 draws the arm 22 upwardly to elevate the rails 14, 16 and associated craft above the level of the water.

As the extension arm 22 is being elevated, the tensioned cord 26 is urged into an annular groove or recess 38 on the pulley 24. Once the rails 14, 16 and craft are lowered into the water, the tension on the cord 26 resulting from the weight of the craft is relieved. The rails 14, 16 are also buoyed so that the cord or rope 26 slackens. There is at that point a tendency of the cord or rope 26 to jump out of the pulley groove 38, which necessitates manual replacement of the cord 26. This problem is further aggravated since at the lower limit of travel of the arm 22, the pulley 24 submerges. The cord 26, which may be nylon or rope that is highly buoyant in water, tends to float away from the pulley 24.

One structure conventionally utilized to attempt to retain the cord 26 operatively on the pulley 24 is shown in FIG. 2. The pulley 24 is mounted on the extension arm 22, which is made from cylindrical tubing. A collar 40 is secured as by set screw 42 in fixed relationship to the arm 22. The collar 40 defines an annular outwardly facing surface 44 against which one side 46 of the pulley 24 abuts to confine laterally inward movement of the pulley 24. The pulley 24 is captured between the collar 40 and an outer collar 48 having an inwardly facing annular surface 50 to abut an outwardly facing surface 52 on the pulley 24 to confine laterally outward movement thereof along the arm 22.

Attached to the collar 48 is an L-shaped shield 54. The shield 54 has one leg 56 attached to the outer surface 58 of the collar 48 so that the other leg 60 extends across the recessed, annular groove 38 in the pulley 24 so that an arcuate surface 61 on the shield 54 is spaced slightly radially outwardly of the cord 26 in the groove 38. A bolt 62 extends consecutively through the shield 54, the collar 48, the arm 22 and back through the collar 48 to secure the shield 54, collar 48 and arm 22 in fixed relative relationship.

The purpose of the shield 54 is to cause the slackened cord 26 to re-enter the groove 38 upon the cord 26 being tensioned However, with the structure in FIG. 2, there is a tendency of the cord 26 to slacken and wrap around the shield 54 so as to become snagged thereon. The present invention obviates this problem.

In FIGS. 3-5, one form of the invention is depicted. The pulley 24 is mounted, as in the prior art structure in FIG. 2, between spaced collars 40, 48 for rotation about the axis of extension arm 22. As seen clearly in FIG. 4, the pulley 24 has a ring-shaped body with an annular outer surface 64. The groove 38 is recessed radially inwardly from the outer surface 64.

Disposed around the pulley 24 is a cord retention member 66. The cord retention member 66 has a radially inwardly facing annular surface 68 of a diameter slightly larger than the diameter of the pulley surface 64 so that the retention member 66 can be moved axially into operative, overlapping relationship with the pulley 24, as shown in FIG. 3. Retention member 66 has a recess 70 extending radially outwardly of the surface 68. Preferably, the recess 70 and groove 38 are similarly configured to loosely seat the cord 26 and have a depth equal to slightly more than one-half of the cord diameter.

To allow passage of the cord 26 into and out of the groove 38 and recess 70, the cord retention member 66 has a slot 74 formed therein, extending through approximately 180° and in axial coincidence with the recess 70. The edges 76, 78 bounding the slot 74 are curved to prevent snagging of the cord 26.

To assembly the cord retention member 66, the member 66 is placed over the pulley 24 so that the groove 38 and recess 70 are in axial alignment. A free end of the cord or rope 26 is fed into the opening defined cooperatively by the groove 38 and recess 70 adjacent one of the edges 76, 78, passed around the pulley 24 and directed out of the slot 74 adjacent the other of the edges 76, 78. The cord 26 thus effectively locks the retention member 66 on the pulley 24 against axial movement while permitting the member 66 to rotate freely relative to the pulley 24. In the depicted embodiment, the surface 68 overlies the pulley groove 38 through approximately 180° and thereby holds the cord captive against the pulley 24. Regardless of how the cord 26 slackens and repositions, the retaining member 66 keeps the cord 26 operatively trained on the pulley 24. The member 66 also tends to rotate in response to slackening of the cord so that the cord 26 is consistently positioned on the pulley 24. The edges 76, 78 smoothly guide passage of the cord 26 as it rotates the pulley 24 so that no snagging occurs between the retention member 66 and pulley 24.

The retention member 66 can be formed of metal, plastic, or other suitable material. It should be understood that the member 66 does not have to form a continuous circle. As long as it extends in excess of 180° around the pulley 24, the cord will effect locking of the member 66 on the pulley 24.

An alternative form of the invention is shown in FIGS. 6-8. A retention member 166 is formed preferably of metal and from a single rectangular blank of sheet material. From the blank, the body 168 of the member 166 is formed in a circle to define a radially inwardly facing surface 170 to surround the outer pulley surface 64. A recess 172 is impressed into the member 166 and has a configuration similar to the recess 70 in the retention member 66. The recess 172 extends approximately 180° in the embodiment in FIGS. 6-8. Rectangular tabs 174, 176 are cut out of the body 168 and folded back to define slots 178, 180° adjacent the blank ends 182, 184 for the passage of the cord 26 as in the prior embodiment.

The present invention affords a structure that can be simply constructed and readily assembled to and removed from an associated pulley 24. Assembly for each embodiment involves simple alignment of the retention member 66, 166 over the pulley and feeding of the cord 26 through the curved space cooperatively defined by the retention member 66, 166 and the pulley 24.

I claim:

1. In combination:

a pulley having a body with a rotational axis, an annular radially outwardly facing surface concentric with the rotational axis, and an annular recess extending radially inwardly of said annular outwardly facing surface; and a cord retention member having a curved radially inwardly facing surface extending through more than 180° for placement around the radially outwardly facing pulley surface with the pulley and cord retention member in operative relationship, said pulley and cord retention member, in the absence of a cord being passed around the pulley, being separable from each other by relative movement axially with respect to each other, there being a recess in said cord retention member extending radially outwardly of said curved radially inwardly facing surface and in axial coincidence with said annular recess in the pulley, whereby with said pulley and cord retention member in said operative relationship and a cord passed around the pulley so as to extend into both the annular recess on the pulley and the recess in the cord retention member, the cord retention member prevents the cord from being drawn axially off of the pulley and the cord provides the sole means to prevent the pulley and cord retention member from being moved axially relative to each other out of said operative relationship with each other.

2. The combination according to claim 1 wherein said curved radially inwardly facing surface on the cord retention member extends completely around said annular outwardly facing surface on the pulley.

3. The combination according to claim 2 wherein there is at least one opening in said curved arcuate surface on the cord retention member to permit passage of a cord therethrough.

4. The combination according to claim 1 wherein said cord retention member is made from metal.

5. The combination according to claim 1 wherein said cord retention member is made from plastic.

6. The combination according to claim 1 wherein said cord retention member is formed from a single blank of sheet metal material.

7. A pulley assembly for an operating cord, said pulley assembly comprising:
   a pulley having a body with a rotational axis and an annular outer surface concentric with the rotational axis;
   a cord retention member having a surface for placement around and in at least partial axial coincidence with the annular outer pulley surface with the pulley and cord retention member in operative relationship and extending through more than 180° around said annular outer surface;
   a cord; and
   cooperating means on said pulley, cord retention member and cord for preventing the cord retention member and pulley from being separated from each other and said operative relationship by relative axial movement solely by the cord extending around the pulley and located between said pulley and the cord retention member and for permitting separation of said cord retention member and pulley from each other and said operative relationship by relative axial movement of said cord retention member and pulley in the absence of said cord extending around the pulley and being located between said pulley and cord retention member.

8. The pulley assembly according to claim 7 wherein said cooperating means comprises an arcuate recess extending radially inwardly of said annular outer surface of the pulley and an arcuate recess extending radially outwardly of the surface of the cord retention member.

9. The pulley assembly according to claim 7 wherein said cord retention member is formed from a rectangular blank of sheet metal and comprises a curved body defining said surface for placement around the pulley, a recess pressed radially outwardly of said retention member surface and at least one tab struck from said body and bent radially outwardly to define an opening to permit passage of the cord therethrough.

10. The pulley assembly according to claim 7 wherein said cord retention member is made from metal.

11. The pulley assembly according to claim 7 wherein said cord retention member is made from plastic.

12. The pulley assembly according to claim 7 wherein said cord retention member is formed from a single blank of sheet metal material.

13. The pulley assembly according to claim 7 wherein said cord retention member comprises an annular ring.

14. In combination:
   a pulley having a body with a rotational axis and an annular outer surface;
   a cord for extension around the annular outer pulley surface;
   a cord retention member having a curved surface extending through more than 180° for situation in surrounding and axial overlapping relationship with the pulley surface with the pulley and cord retention member in operative relationship; and
   cooperating means on the pulley, cord retention member and cord for preventing separation of the pulley and cord retention member by relative axial movement therebetween solely by the cord extending around the pulley surface and the pulley and cord retention member in said operative relationship and for permitting the cord retention member and pulley to be separated from said operative relationship by relative axial movement between the cord retention member and pulley in the absence of the cord extending around the pulley.

15. The combination according to claim 14 wherein said cord retention member is continuous and annular and the cord retention member and pulley are coaxial with the cord retention member and pulley in said operative relationship.

* * * * *